Nov. 2, 1954   A. R. GAGNE   2,693,056
CUTTING MEANS
Filed April 19, 1954   2 Sheets-Sheet 1

INVENTOR.
Archie R. Gagne
BY Robert L. Kahn
Attorney

Nov. 2, 1954
A. R. GAGNE
2,693,056
CUTTING MEANS
Filed April 19, 1954
2 Sheets-Sheet 2
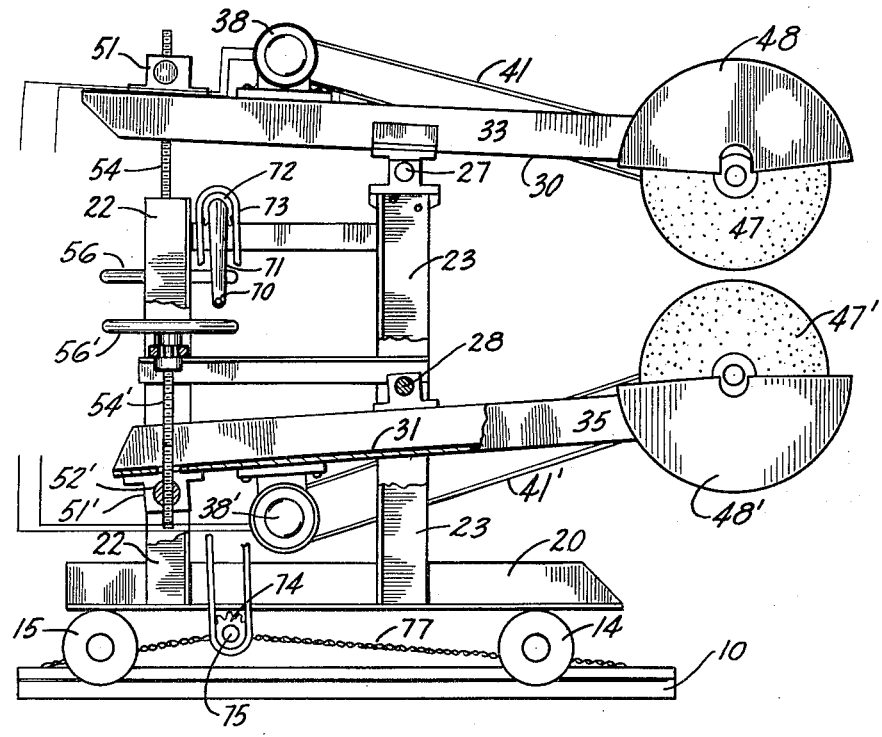
Fig 3
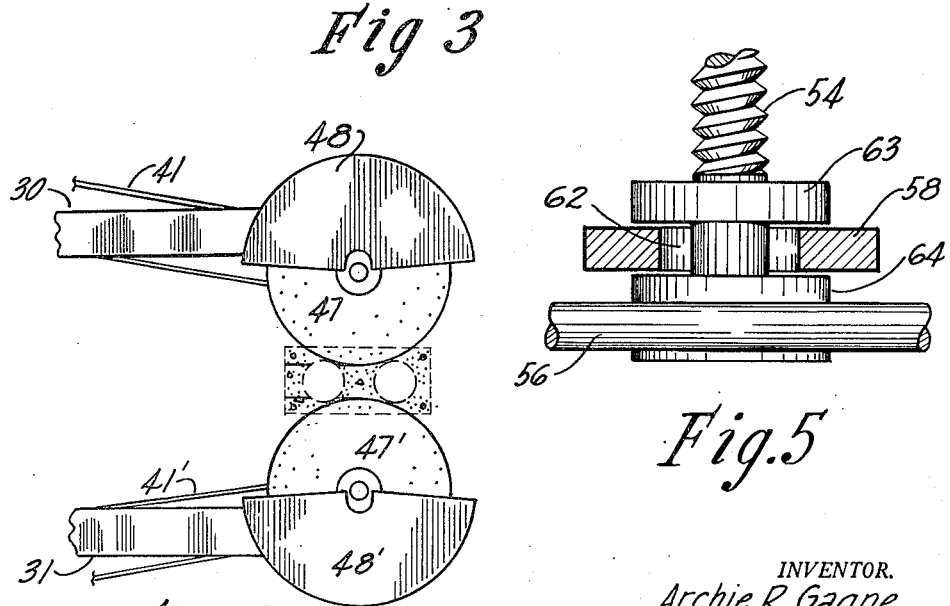
Fig. 4
Fig. 5
INVENTOR.
Archie R. Gagne
BY Robert L. Kahn
Attorney United States Patent Office 2,693,056
Patented Nov. 2, 1954

2,693,056
CUTTING MEANS
Archie R. Gagne, Homewood, Ill.
Application April 19, 1954, Serial No. 424,021
4 Claims. (Cl. 51—80)

This invention relates to a cutting means and particularly to a cutting means using relatively thin discs of "Carborundum" or other abrasive. The cutting means to be hereinafter described may be generally useful for a wide variety of purposes but is particularly useful in connection with sawing concrete beams or concrete material of the type having steel reinforcement.

While high speed circular grinding discs or cutting discs are well known, the cutting means previously available for handling concrete slabs or beams have been characterized by a number of serious drawbacks. For one, such cutting means have necessitated the employment of cutter discs having relatively large diameter and have necessitated the replacement of such discs when wear has reduced the diameter thereof by a comparatively small amount. Thus such discs even when worn have considerable life left in them if the apparatus can use such cutters. Where concrete beams having dimensions of the order of about 4" by 8" are to be sawed, cutters in conventional apparatus have had to be replaced after comparatively slight use. Inasmuch as such cutter discs vary in cost depending upon the diameter, it will be clear that any apparatus involving or requiring the use of a disc having a large diameter and requiring the replacement of such disc after the diameter has been reduced by about 25% will obviously be expensive to operate.

In accordance with this invention, a cutter or saw is provided wherein cutter discs of relatively small diameter may be used and wherein the cutter discs may be used even though the useful diameter has been reduced to a value substantially less than the original starting diameter of such discs.

The new construction has a movable carriage having a pair of oppositely disposed tilt plates or supports. Each support is pivotally secured and has a cutter disc at one end thereof and electric motor for driving the cutter disc at the other end thereof. Thus each plate or support resembles a see-saw. Suitable belt means connect the motor and cutter disc. Means are provided for adjusting the supports so that the cutter discs may be caused to approach each other or recede from each other, depending upon the depth of cut to be made. The entire mounting with cutter disc and motor may be moved with the carriage relatively to the work to be cut so that a straight cut may be obtained.

By virtue of the present invention, cutter discs of initially small size may be used, this greatly reducing the initial cost of a cutter. Additionally, when a cutter disc has worn down, it may still be used so long as there is some cutter material extending beyond the bushing carrying the cutter disc. By virtue of having two opposed cutter discs, the effective depth of a cut is increased. This is particularly desirable in case of prestressed concrete beams such as disclosed, for example, in United States Patent No. 2,299,070. As described in said patent, these beams are cored and have steel prestressing or reinforcing rods disposed near the surface thereof. For use with such beams, the cutting apparatus to be hereinafter described is particularly effective since a cutter disc of even small diameter will suffice to penetrate enough concrete to reach the steel. By virtue of the cored construction of these prestressed and precast beams, oppositely directed cuts transversely of the beam will suffice provide the cuts are deep enough to sever the prestressing steel rods. Due to the thinness of the concrete at the central zone of the beam, a blow or tap on a beam will suffice to completely sever a beam after shallow cuts have been made on opposite sides of the beam.

In order that the invention may be fully understood and disclosed, reference will now be made to the drawings wherein an exemplary embodiment is illustrated. It is understood, however, that variations may be made within the scope of this invention as defined by the appended claims.

In the drawings, Figure 1 is a perspective view of a machine embodying the present invention.

Figure 3 is a side elevation of the machine shown in Figure 1.

Figure 4 is a detail showing a pair of opposed cutting discs cooperating to saw through a concrete beam.

Figure 5 is a detail illustrating the cutter elevation adjustment.

Figure 1:
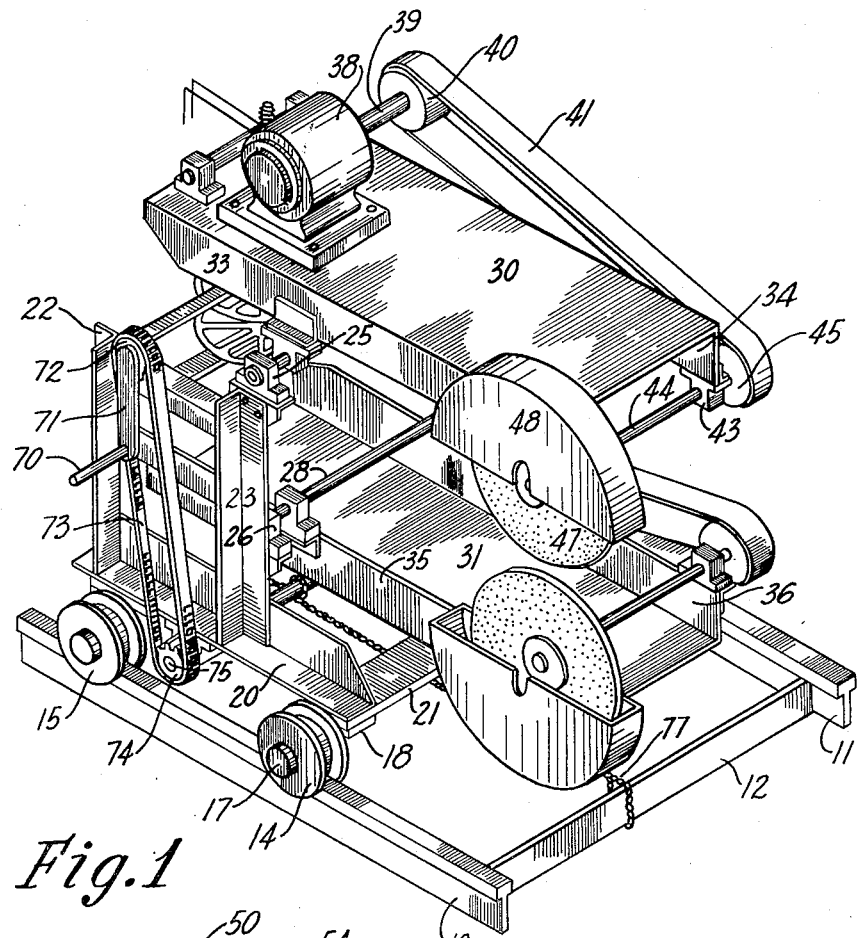

The machine is supported upon a pair of tracks 10 and 11 maintained rigidly in predetermined parallel relation by cross members, one such cross member appearing in Figure 1 and being designated by numeral 12. Riding on tracks 10 and 11 are flanged wheels 14 and 15, there being a corresponding pair on the other side of the machine. The wheels are rotatably supported by suitable pins or stub shafts 17 carried by brackets 18. Brackets 18 support angle pieces 20 along the two sides of the machine. Transverse members 21 extend between the angle irons on both sides of the machine to provide a rigid frame which may roll on the tracks.

Upwardly extending on each side of the machine from angle irons 20 are vertical angle irons 22 and 23. Angle irons 23 (both sides of the machine are similar) carry upper and lower pillow blocks 25 and 26. Secured in pillow blocks 25 is transverse pivot pin 27. Lower pillow blocks 26 have transverse pivot pins 28. Pivot pins 27 and 28 have rockably mounted thereon supporting plates 30 and 31 respectively. These two plates resemble see-saws and are similar and are provided with sides 33 and 34 for plate 30, and sides 35 and 36 for plate 31. Tilt plates 30 and 31 are disposed so that their respective sides extend toward each other. These plates and the parts previously described are all of steel.

Plate 30 has suitably attached thereto electric motor 38. Motor 38 is mounted to one side of the axis of pivot pin 27. For convenience, the end of the machine to the left of pivot pins 27 and 28 as seen in Figure 3 will be referred to as the rear of the machine while the remainder of the machine to the right of these pins will be referred to as the front part of the machine. Motor 38 is disposed so that its shaft 39 is parallel to pivot pin 27. Shaft 39 carries pulley 40 upon which rides belt 41.

The front end of support plate 30 carries journals 43 in which there is disposed shaft 44. Shaft 44 is parallel to shaft 39 and carries pulley 45 cooperating with belt 41. Pulleys 40 and 45 and belt 41 are beyond the side of support plate 30. Shaft 44 extends beyond both sides 33 and 34 of support plate 30. The free end of shaft 44 is suitably threaded and is provided with a bushing for accommodating cutting disc 47. Cutting disc 47 may be of "Carborundum" or of other material and the hub portion of the cutter disc will be clamped between steel washers in the customary fashion. Safety guard 48 carried by plate 30 covers the upper half of cutter wheel 47.

Support plate 31 is similarly provided with electric motor 38' on the under side thereof. The remainder of the construction including the pulleys, belt, cutter disc and cutter disc shaft are all similar. Plates 30 and 31 face each other and both have corresponding mechanical elements.

Figure 2:
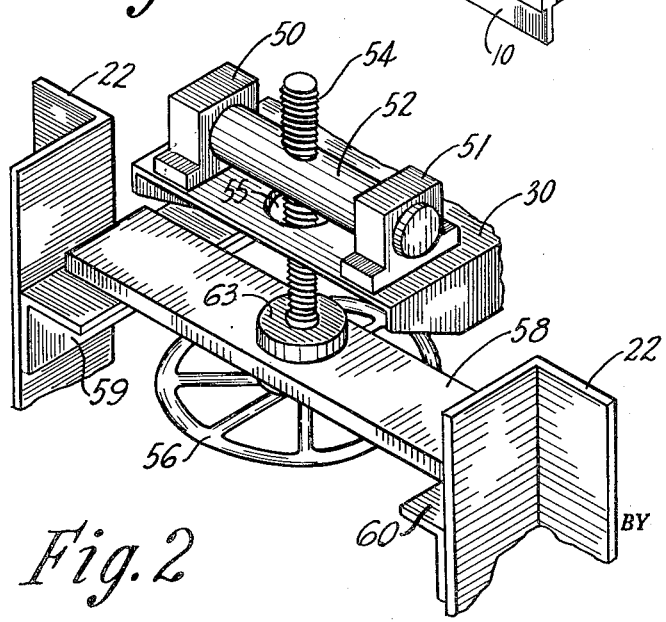
Figure 2 is a detail illustrating the means for adjusting the elevation of a cutting disc.

The two support plates and the motor and cutters carried thereby are arranged so that each support plate is generally balanced with respect to its pivot pin. The balance does not have to be precise and in fact, a balance is not even necessary. Means are provided for rocking each support plate around its pivot pin and adjusting the position of the plate. These two means are similar for both plates and one such means is illustrated in detail in Figures 2 and 5.

Thus referring to support plate 30 for example, the rear end thereof carries pillow blocks 50 and 51 in which is rockably secured pin 52. Pin 52 has a transverse aperture at the center, this aperture being threaded and accommodating adjusting screw 54. Adjusting screw 54 extends through aperture 55 in support plate 30 and carries hand wheel 56 at one end thereof. Adjusting screw 54 passes through support plate 58 disposed between angle irons 22. Support plate 58 may be riveted or otherwise attached to angles 59 and 60 carried by angle irons 22. Adjusting screw 54 passes through clearance aperture 62 in plate 58, this aperture and clearance aperture 55 being both large enough to permit some transverse movement of the screw.

Adjusting screw 54 has rigidly attached thereto plate 63 and hub 64 of wheel 56 on opposite sides of plate 58. Plate 63 and hub 64 are larger than clearance aperture 62 and are supported by a distance somewhat greater than the thickness of plate 58. When hand wheel 56 is turned, screw 54 will be able to adjust itself with relation to plate 58 while plate 63 and hub 64 will prevent longitudinal movement of screw 54. It is clear therefore that turning of screw 54 will adjust the vertical position of the rear end of tilt plate 30 and consequently will control the elevation of cutter 47.

The same means is provided for adjusting the elevation of the lower cutter disc. The adjusting means for the lower cutting disc is reversed with the hand wheel being on top and the adjusting screw extending downwardly. The travel of the entire carriage along tracks 10 and 11 is controlled by handle 70 carried by crank 71. Crank 71 operates pinion 72 which is coupled by belt 73 to pinion 74 suitably secured on shaft 75 rotatably supported by the carriage. Shaft 75 may have one turn of rope 77 around the same, the ends of the rope being tied to cross members at the two ends of the carriage. The feed depends upon the friction between the rope and the shaft and by virtue of this arrangement, the possibility of too rapid a feed of the carriage along the work is avoided.

The cutter discs are adjusted to provide a desired clearance between the same. Where concrete, brick or other brittle material is being sawed, it will generally not be necessary to cut completely through the material. However, where a complete cut through the material is to be provided, it may be desirable to offset the drive shaft of one cutter disc with reference to the other so that the two shafts are not vertically alined. Thus for example, if the top cutter disc is somewhat to the left of the bottom as seen in Figure 3, for example, then the two cutter discs may be so adjusted that the line of cut of one cutter disc will be at or somewhat beyond the line of cut of the other cutter disc. The same effect may be obtained by keeping the discs in the same position as illustrated in Figure 3 but tilting the tracks and carriage and tilting the work. Thus one cutter disc will engage the work, assuming it to be a rectangular object, before the other disc engages and the line of cut of one may overlap the line of cut of the other, thus securing a complete severance. In such case, however, as the discs wear, the center of rotation of the discs will have to be adjusted to compensate for reduced diameter of the two cutters.

What is claimed is:

1. Cutting means for use on reinforced concrete beams and the like, said cutting means comprising a carriage, a pair of spaced supports, means for pivotally supporting said supports on spaced parallel horizontal axes, said horizontal axes being in vertically spaced relation, each support resembling a see-saw with the forward part of each support being substantially longer from the pivot point than the rear part of the support, means at the forward end of each support for securing an abrasive disc for rotation, the axis of rotation being horizontal and parallel to the pivot axis of the support, an electric motor near the rear end of the support with the motor shaft parallel to the pivot axis, a belt connecting said motor and rotary disc means, means for adjusting each support independently of the other about the pivot axis to determine the separation between the opposed cutter discs and means for moving said carriage in a direction perpendicular to the pivot axis of said supports whereby said discs may be adjusted to have a desired separation therebetween and said carriage moved to move said discs through the work.

2. Cutting means for use on reinforced concrete beams and the like, said cutting means comprising a carriage, a pair of spaced supports, means for pivotally supporting said supports on spaced parallel horizontal axes, said horizontal axes being in vertically spaced relation, each support resembling a see-saw with the forward part of each support being substantially longer from the pivot point than the rear part of the support, means at the forward end of each support for securing an abrasive disc for rotation, the axis of rotation being horizontal and parallel to the pivot axis of the support, an electric motor near the rear end of the support with the motor shaft parallel to the pivot axis, a belt connecting said motor and rotary disc means, a screw supported by said carriage for each support, means disposing said screw in generally perpendicular relation to the corresponding support, nut means carried by said support for cooperation with said screw, and thrust means for preventing longitudinal movement of said screw with respect to said carriage whereby rotation of said screw will cause said carriage to rock on its pivot axis for adjustment.

3. The construction according to claim 2 wherein said nut means comprises pillow blocks carried by said support and a threaded elongated member carried by said pillot blocks, said threaded elongated member extending generally parallel to the pivot axis of the support.

4. The construction according to claim 3 wherein friction means are provided for feeding said carriage along a line generally perpendicular to the pivot axis of the supports.

No references cited.